(12) United States Patent
De Bonet et al.

(10) Patent No.: US 6,510,177 B1
(45) Date of Patent: Jan. 21, 2003

(54) SYSTEM AND METHOD FOR LAYERED VIDEO CODING ENHANCEMENT

(75) Inventors: Jeremy De Bonet, Cambridge, MA (US); Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/535,159

(22) Filed: Mar. 24, 2000

(51) Int. Cl.[7] ................................................ H07N 7/18
(52) U.S. Cl. .............................. 375/240.16; 375/240.1; 375/240.11
(58) Field of Search ........................ 375/240.08–240.19

(56) References Cited

U.S. PATENT DOCUMENTS

| | | | | |
|---|---|---|---|---|
| 6,057,884 A | * | 5/2000 | Chen et al. ..................... | 348/42 |
| 6,229,850 B1 | * | 5/2001 | Linzer et al. ............. | 375/240.1 |
| 6,272,253 B1 | * | 8/2001 | Bannon et al. ............. | 382/236 |
| 6,292,512 B1 | * | 9/2001 | Radha et al. .......... | 375/240.05 |
| 6,330,280 B1 | * | 12/2001 | Suzuki et al. .......... | 375/240.08 |

OTHER PUBLICATIONS

Malvar, H.S.: "Fast Progressive Wavelet Coding", IEEE, pp. 336–343, 1999.

Co–pending U.S. patent application, Ser. No. 09/276,954, "Image Encoding Using Reordering and Blocking of Wavelet Coefficients Combined with Adaptive Encoding," filed Mar. 26, 1999.

Co–pending U.S. patent application, Ser. No. 09/280,135, "Reordering Wavelet Coefficients for Improved Encoding," filed Mar. 26, 1999.

Co–pending U.S. patent application, Ser. No. 09/277,255, "Lossless Adaptive Encoding of Finite Alphabet Data," filed Mar. 26, 1999.

\* cited by examiner

*Primary Examiner*—Andy Rao
(74) *Attorney, Agent, or Firm*—Lyon & Harr, LLP; Craig S. Fischer

(57) ABSTRACT

A system and a method for encoding, transmitting, decoding and storing a high-resolution video sequence using a low-resolution base layer and a higher-resolution enhancement layer. The base layer contains low-resolution video information and is compressed in a manner such that it can be decoded independently of the enhancement layer. The base layer may be encoded in an existing standard video format (such as MPEG-2). The enhancement layer, which contains high-resolution information, provides a variable amount of enhancement to the base layer. The compressed video sequence is transmitted in two layers and uses a minimum amount of bit rate by using information transmitted in the base layer in the decoding of both the base layer and the enhancement layer. In an enhanced decoder, both the base layer and the enhancement layer use this information that has been transmitted in the base layer.

54 Claims, 11 Drawing Sheets

SYSTEM AND METHOD FOR LAYERED VIDEO CODING ENHANCEMENT

TECHNICAL FIELD

The present invention relates in general to video compression and more particularly to a system and a method for encoding, transmitting, decoding and storing a high-resolution video sequence using a low-resolution base layer and a higher-resolution enhancement layer.

BACKGROUND OF THE INVENTION

Bit rate reduction is vitally important to achieve the objective of sending as much information as possible with a given communication or storage capacity. Bit rate is the amount of data that can be transmitted in a given time. Bit rate reduction is important because communication capacity is limited by regulatory, physical and commercial constraints and, as demand increases for higher resolution television and video, it is crucial that maximum use be made of the limited capacity available on any given communication or storage medium.

One technique of managing bit rate is data compression. Data compression is storing data in a format that requires less space than would otherwise be used to store the information. Data compression is particularly useful in the transmission of information because it allows a large amount of information to be transmitted using a reduced number of bits. Lossless data compression, which is used mainly for compressing text information, programs, or other computer data refers to data compression formats in which no data is lost. Greater compression can be achieved on graphics, audio and video data by using lossy compression, which refers to data compression formats in which some amount of representation fidelity is lost. Most video compression formats use a lossy compression technique. A compression method with a high degree of bit rate reduction for a given level of fidelity is said to have good compression efficiency.

The well-known International Telecommunications Union-Telecommunications (ITU-T) H.26x and Moving Picture Experts Group (MPEG) video coding standards are examples of a family of conventional video compression formats that use lossy compression. These coding techniques provide high compression rates by representing some image frames as only the changes between frames rather than the entire frame. The changing information is then encoded using a technique called Motion-Compensated Discrete Cosine Transform (MC+DCT) coding. Motion compensation (MC) approximates each area of a video picture as a spatially-shifted area of a previously-decoded picture, and Discrete. Cosine Transform (DCT) coding is a technique that represents waveform data as a weighted sum of cosine waveforms. In general, ITU-T and MPEG video compression remove temporal redundancy between video frames by means of motion compensation, remove spatial redundancy within a video frame by means of a Discrete Cosine Transform and quantization approximation rounding of the DCT samples, and to remove statistical redundancy of quantized index values by means of statistical lossless entropy-reduction coding.

More particularly, ITU-T and MPEG coding work by dividing each frame into rectangular (such as 16×16 pixel) macroblocks and first determining how each macroblock has moved between frames. A motion vector defines any motion of the macroblock that occurs between frames and is used to construct a predicted frame. A process called motion estimation takes place in the encoder to determine the best motion vector value for each macroblock. This predicted frame, which is a previously-decoded frame adjusted by the motion vectors, is compared to an actual input frame. Any new information left over that is new is called the residual and used to construct residual frames.

There are generally three main types of coded pictures in such conventional video coding: (1) intra pictures (I-frames); (2) forward predicted pictures (P-frames); and (3) bi-directional predicted pictures (B-frames). I-frames are encoded as independent pictures with no reference to past or future frames. These frames contain full picture information and can be used to predict other frames. P-frames are encoded relative to the past frames, while B-frames are encoded relative to past frames, future frames or both. ITU-T and MPEG coding use these three types of frames and encoded motion vectors to represent video. This video representation is performed by using I-frames at the start of an independent sequence of pictures and then using P and B frames to encode the remaining pictures in the sequence.

One problem with ITU-T and MPEG coding is that the decoding of high-resolution video requires far greater computational complexity than what is required for lower-resolution video. This means that high-resolution decoders are significantly more expensive than those decoders used for lower resolution video. Delivery of high-resolution video also requires a much higher bit rate than does lower-resolution video. It is therefore highly desirable to provide support for delivery of the same video content as either low-resolution video or as high-resolution video.

One technique of video coding that encodes video using a low-resolution base layer and a higher-resolution enhancement layer is known as spatially-scalable video coding. Spatially-scalable video coding uses a base layer that is decodable as a conventional non-layered video representation at a lower bit rate than an enhancement layer used for the high-resolution video. This allows the base layer to serve lower-capacity receivers while enabling better service for higher-capacity receivers (that receive both the base and enhancement layers). The base layer may also be designed to conform to some prior standard encoding method, in order for the base layer to leverage receivers manufactured to popular and widely-used designs.

One disadvantage, however, of spatially-scalable video coding is that there is a significant loss of compression efficiency for the high-resolution video representation relative to a separate encoding of the high resolution video using the same total bit rate but without the scalability layering structure.

There exists a need, therefore, for a system and a method of encoding, transmitting, decoding and storing a high-resolution video sequence that provides higher compression efficiency than current standard techniques while retaining the advantages of spatially-scalable layered video coding. Such a system and a method would have relevance for HDTV and beyond, and could potentially become a universal video protocol for such widespread use as the Internet, digital video disks (DVD) and new generations of home and commercial video recording devices.

SUMMARY OF THE INVENTION

To overcome the limitations in the prior art as described above and other limitations that will become apparent upon reading and understanding the present specification, the present invention is embodied in a system and a method for transmitting and storing high-resolution video using a low-resolution base layer and a higher-resolution enhancement layer. The present invention uses decoded low-resolution images and additional data from the low-resolution video representation to aid in the decoding of the higher-resolution video. In particular, a preferred embodiment uses motion vector data from the low-resolution video representation to aid in the decoding of the higher-resolution video. The present invention provides high fidelity, uses a minimum amount of bit rate, and can be applied in a manner which allows the low-resolution video to remain backward-compatible with existing standard video compression technology (such as the ITU-T and MPEG standards).

In particular, the present invention is especially well-suited for transmitting and delivering encoded higher-resolution video so that it can be viewed simultaneously in low resolution by a base layer decoder and in enhanced high resolution by an enhancement layer decoder. The present invention divides and encodes a high-resolution video sequence into a lower-resolution base layer and a higher-resolution enhancement layer. The low-resolution base layer, although encoded using a special encoder, can remain, if desired, completely compatible with existing standard video compression formats (such as ITU-T or MPEG standards). If the present invention is designed in this compatible fashion, the low-resolution base layer can be correctly decoded using a base layer decoder without access to (or any awareness of) the enhancement layer data. Thus, a decoder for an existing standard (such as ITU-T or MPEG standards) may be leveraged by the present invention to decode the low-resolution base layer without any knowledge or use of the accompanying higher-resolution enhancement layer.

The higher-resolution enhancement layer of the present invention is decoded using an enhancement decoder that makes use of the decoded base layer images, the enhancement layer encoded data and additional data from the encoded base layer data. In particular, in a preferred embodiment, the encoded base layer data includes motion vector data that is used to decode the enhancement layer. A key element of the invention is that, in addition to the decoded images, base layer data (such as motion vectors) are used in decoding both the base layer and the enhancement layer. In other words, the decoding of the enhancement layer leverages data used in the decoding of the base layer.

The amount of enhancement is variable and can be selected by, for example, a viewer, a manufacturer or a cable service provider. Variable enhancement is important because different devices can subscribe to different levels of enhancement. For example, a 32-inch HDTV may subscribe to less enhancement than a 64-inch HDTV because the 32-inch HDTV requires less resolution. In addition, variable amounts of enhancement permit flexible pricing schemes whereby more expensive televisions and cable boxes provide greater resolution.

The system of the present invention includes a layered video encoder and a layered video decoder, and alternatively a base video decoder not supporting the layering feature. The layered video encoder receives a high-resolution video sequence and outputs a compressed video stream including a base layer and an enhancement layer. The base layer compressed stream, which is created by a base layer encoding module, is an independently-decodable low-resolution video stream. In some embodiments, the base layer video stream will conform to an existing standard video compression format and will be capable of being decoded by standard video decoders. The base layer contains data (such as motion vectors) that are used in decoding both the base layer and the enhancement layer. The enhancement layer, which is created by an enhancement layer encoding module, is a higher-resolution video stream that contains higher-resolution video information and provides high-resolution enhancement to the base layer. The layered video decoder includes a base layer decoder module, for decoding the base layer, and an enhancement layer decoder module, for decoding the enhancement layer.

The present invention also includes a method for encoding a high-resolution video sequence to produce a base layer and an enhancement layer. Specifically, the present invention processes the high-resolution video sequence to create a low-resolution base layer that is independently decodable. Further, the present invention then produces an enhancement layer which provides higher-resolution enhancement to the base layer and permits the amount of enhancement to be continuously varied. In addition, the ratio of the bit rate dedicated to the transmission of the base layer versus the enhancement layer is variable and can be adjusted to suit the needs of the specific application.

The present invention also includes a method for leveraging transmitted motion vector information for use in the decoding of both the base and enhancement layers. Specifically, the present invention calculates motion vectors in a high-resolution video sequence, scales them down for use with lower-resolution video, transmits the motion vectors in a base layer and then scales them up during decoding. Although they are transmitted in the base layer, these motion vectors are used in the decoding of both the base layer and the enhancement layer. The present invention may be embodied in a computer-readable medium having several computer-executable modules for performing the functions described above.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

Exemplary Operating Environment

Figure 1:
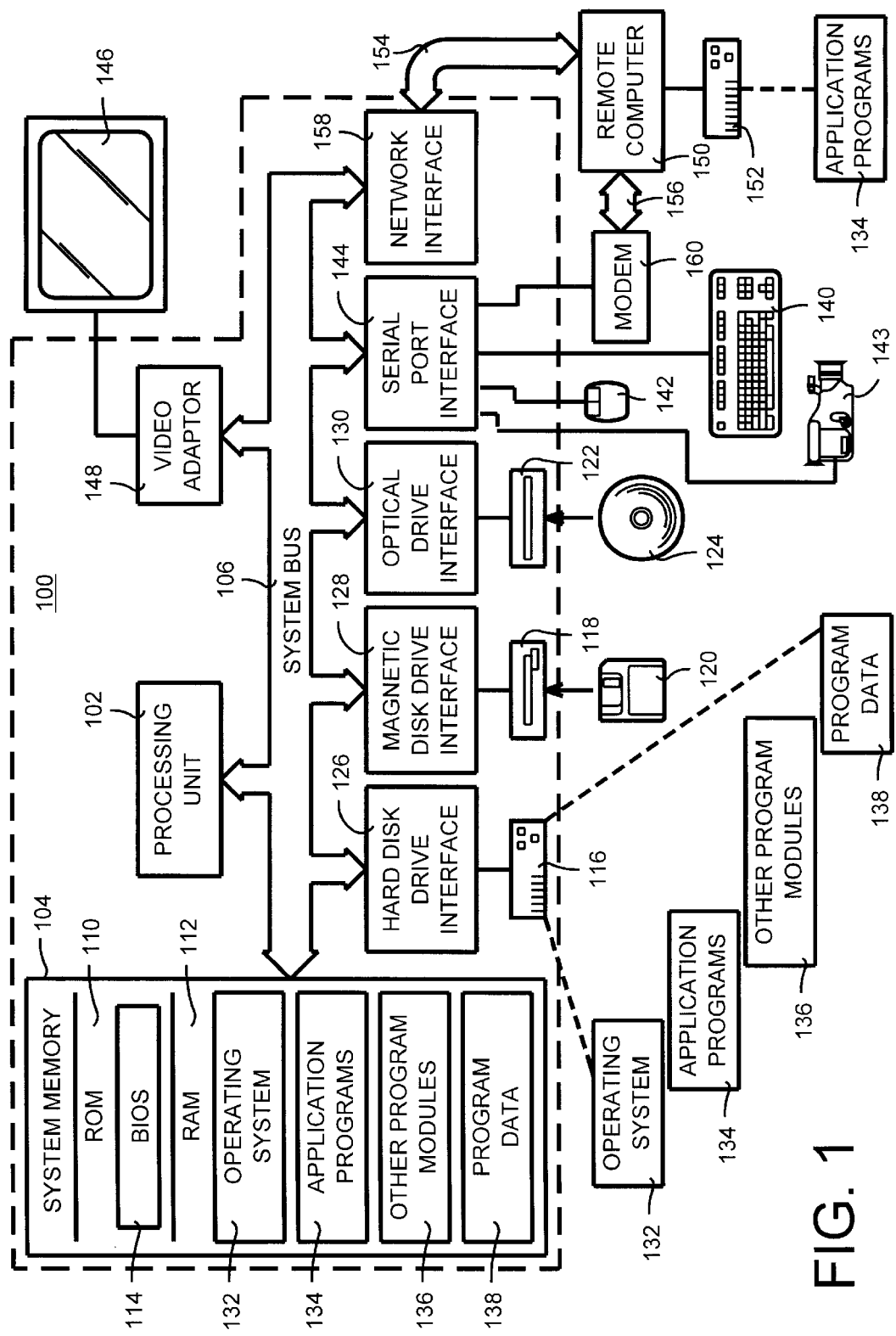
FIG. 1 is a block diagram illustrating an apparatus suitable for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system (BIOS) 114, containing the basic routines that help to transfer information between elements within the computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide storage of computer readable instructions, data structures, program modules and other data for the computer 100.

Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may include communication media and computer storage media. Communication media typically includes computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. As an example, and without limitation, communication media includes wired media such as wired network or direct wired connection, and wireless media such as acoustic, radio frequency (RF), infrared and other wireless media. Computer storage media includes any method or technology for the storage of information such as computer readable instructions, data structures, program modules or other data. By way of example, and not limitation, computer storage media includes RAM, ROM, EPROM, flash memory or other memory technology, CD-ROM, digital video disks (DVD) or other optical disk storage, magnetic storage devices, or any other media that can be used to store the desired information and that can be accessed by the computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the computer 100 through input devices such as a keyboard 140 and a pointing device 142. In addition, a video camera 143 (or other types of video devices) may be connected to the computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156 such as the Internet. The modem 160, which may be internal or external, is connected to the system bus 106 via the serial port interface 144. In a networked environment, program modules depicted relative to the computer 100, or portions thereof, may be stored in the remote memory storage device 152. It will be appreciated that the network connections shown are exemplary and other means of establishing a communications link between the computers may be used.

I. Introduction

As shown in FIGS. 2–11 for the purposes of illustration, the present invention is embodied in a system and a method for transmitting and storing a high-resolution video sequence using a base video encoded layer and an enhancement encoded layer. The system includes a layered video encoder that divides and encodes the high-resolution video sequence into a base layer and an enhancement layer. The base layer includes a low-resolution video stream that uses a conventional compression format (such as MPEG-2) and may be decoded independent of the enhancement layer using a conventional video decoder. The enhancement layer includes a high-resolution video stream that provides variable enhancement of the base layer. Encoded within the base layer data are data (such as motion vectors) that are used in the decoding of both the base and enhancement layers. In a preferred implementation, motion vectors encoded within the base layer are used in the decoding of both layers. These motion vectors are computed from the high-resolution video sequence, adjusted for use with a block size and vector accuracy appropriate for the base layer (also called "downsampling"), transmitted within the base layer and "upsampled" during decoding.

The present invention provides high fidelity using a minimum bit rate and produces a base layer that can be designed, if desired, to be completely compatible with existing conventional compression formats and video decoders. For example, when the base layer is encoded using the MPEG-2 format, the base layer may be decoded using a MPEG-2 decoder. Moreover, the amount of enhancement provided by the enhancement layer can be varied to allow different levels of enhancement subscription. For example, a cable service provider may provide different decoder boxes that subscribe to different amounts of enhancement and permit better picture quality depending on the amount of money the customer wants to spend. The enhancement layer leverages information contained in the base layer (such as, for example, motion vectors) to reduce the bit rate needed for representing the enhancement layer. The present invention provides excellent high-fidelity, high-resolution video using a limited amount of bit rate while retaining backward compatibility with conventional video compression technology by means of its low-resolution base layer.

II. General Overview

Figure 2:
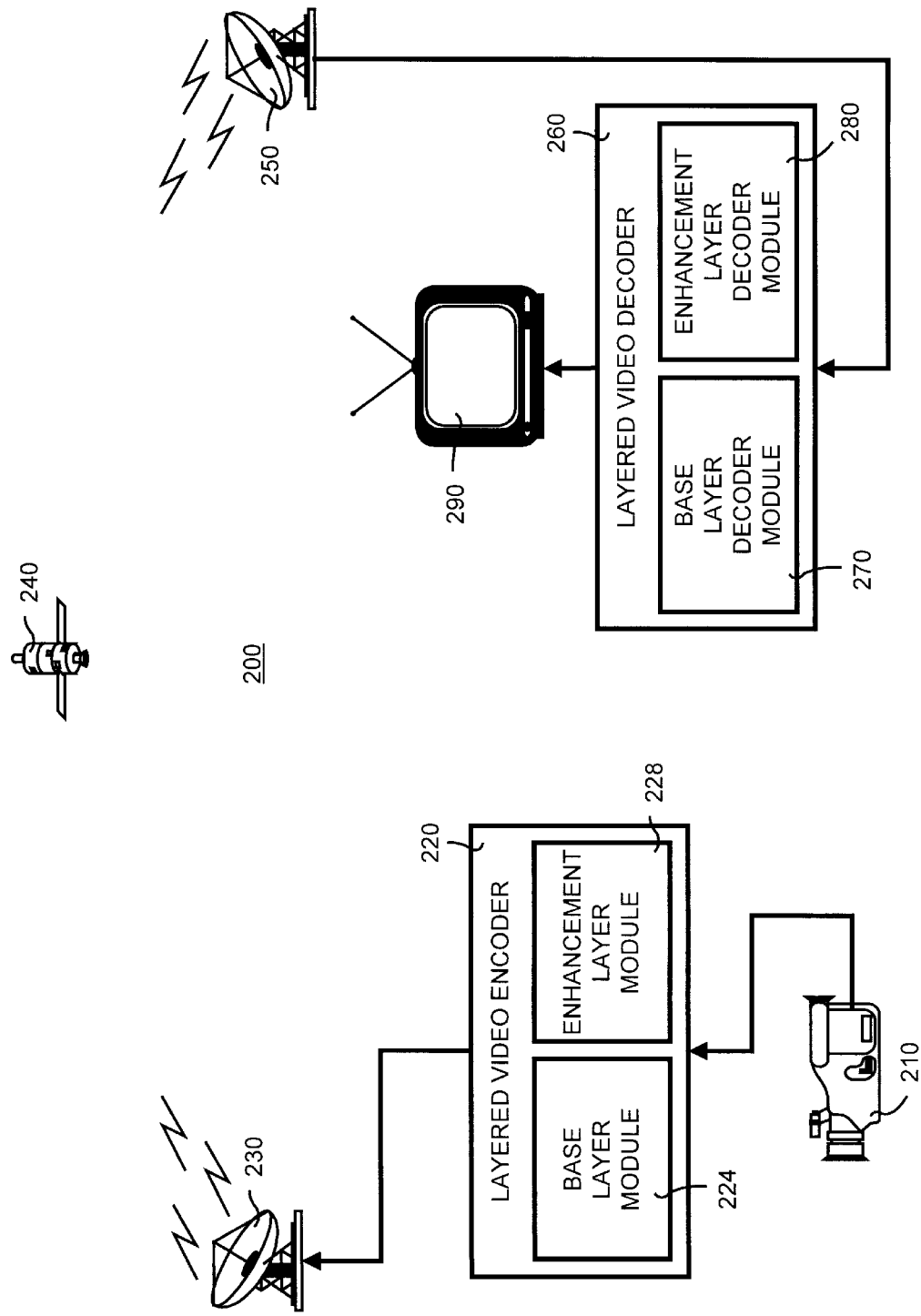
FIG. 2 shows an overall block diagram of a video delivery system incorporating the present invention and is shown for illustrative purposes only.

FIG. 2 is an overview block diagram showing one example of how the present invention may be implemented. In particular, the present invention is shown incorporated into a video delivery system 200. The video delivery system 200 shown is only one example of several types of systems that may incorporate the video encoder and decoder of the present invention. In general, a high-resolution video sequence (not shown) is captured by a video camera 210, processed by a layered video encoder 220 of the present invention and transmitted via a transmitter 230. A receiver 250 receives the transmitted video signal and decodes the signal using a layered video decoder 260 of the present invention. The decoded video signal is then viewed using, for example, a HDTV set 290. Typically, the high-resolution video sequence is captured, encoded and transmitted by a commercial broadcasting company either live or contained on storage media. The receiver 250, layered video decoder 260 and the television 290 would typically be located within a subscriber's home. Alternatively, the receiver 250 may be owned, for example, by a cable service provider and the video signal may be sent to the subscriber's home for decoding by the layered video decoder 260 and viewing on the television 290. In addition, the layered video decoder may be a separate unit or contained within a television (such as the HDTV set 290) or a cable box (usually owned by a cable service provider and leased by a customer).

An input to the video delivery system 200 is the high-resolution video sequence that is captured by the video camera 210. This high-resolution video sequence is sent from the video camera 210 to the layered video encoder 220. As explained in detail below, the layered video encoder 220 of the present invention encodes the high-resolution video sequence using a layering technique of the present invention. In particular, the high-resolution video sequence is encoded into a base layer, which consists of an encoded low-resolution video stream representation of the video sequence (and which may be encoded in a conventional compression format) and an enhancement layer, which includes encoded high-resolution information. The layered video encoder 220 includes a base layer module 224, for providing a base layer that contains low-resolution video information and that can be in a conventional compression format, and an enhancement layer 228, for providing high-resolution information.

The encoded, layered video signal (not shown) is sent to the transmitter 230, which, as shown in FIG. 2, sends the signal via a satellite 240. Alternatively, many other ways of transmitting the video sequence are known to those skilled in the art and include, for example, wireless, cable and telephone transmission. The satellite 240 relays the video signal to the receiver 250 that forwards the video signal to the layered video decoder 260. The layered video decoder 260 includes a base layer decoder module 270, for decoding the base layer containing the low-resolution information, and an enhancement layer decoder module 280 for decoding the enhancement layer containing the high-resolution information. The decoded video signal is then sent to the HDTV set 290 for viewing.

As explained above, due to commercial, regulatory and physical constraints only a limited amount of bit rate is available for transmitting a video signal (for example, a television program). In addition, there exists a need to remain backward-compatible with standard video compression technologies (such as MPEG-2) due to a significant investment in the standard technology by hardware manufacturers, software developers and consumers. The present invention addresses these needs by providing a system and a method of transmitting and storing a high-resolution video sequence by dividing the video into a low-resolution base layer and a high-resolution enhancement layer. The base layer, although specially prepared, can be completely compatible with standard video compression technologies. Therefore, in a preferred embodiment, a standard video decoder would be completely compatible with the encoded base layer and could receive and correctly decode the base layer while remaining completely unaware of the enhancement layer.

Figure 3:
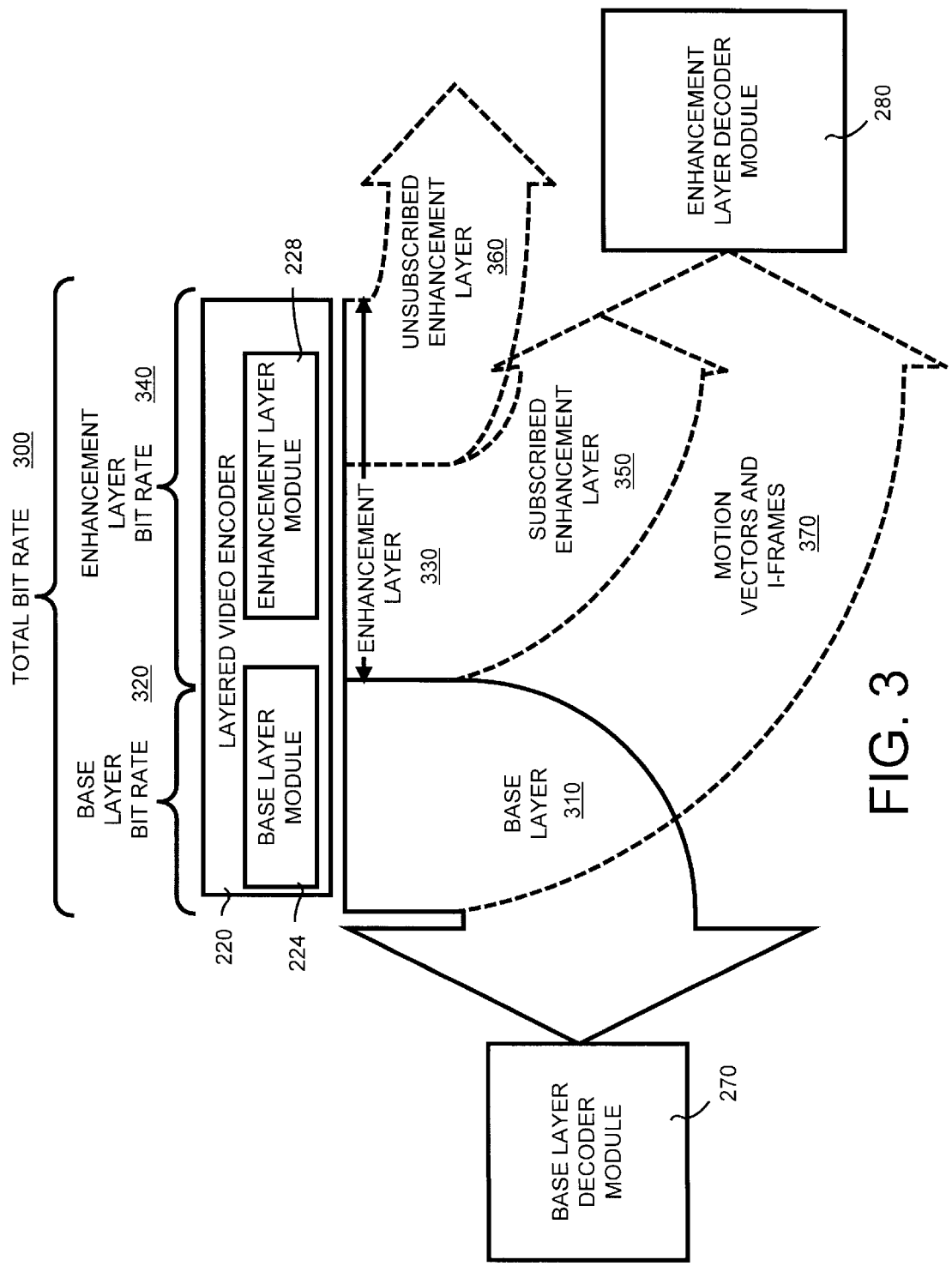
FIG. 3 is a block-flow diagram illustrating general function of the layered video encoder and decoder of FIG. 2.

FIG. 3 is a block-flow diagram illustrating general function of the layered video encoder and decoder of FIG. 2. In general, the video signal from the video camera 210 is encoded by the layered video encoder 220 and transmitted over a channel supporting a certain channel bit rate 300. The encoded video signal includes a base layer 310, encoded by the base layer module 224 and sent using a base layer bit rate 320 and the enhancement layer 330, encoded by an enhancement layer module 228 and sent using an enhancement layer bit rate 340. The base layer 310 is received and decoded by the base layer decoder module 270 while the enhancement layer 330 is received and decoded by the enhancement layer decoder module 280.

In particular, the total bit rate 300 available for transmission of the encoded video signal is typically the sum of the base layer bit rate 320 and the enhancement layer bit rate 340. The encoded video signal is created by the layered video encoder 220, which generates the base layer 310 and the enhancement layer 330. After encoding, the video signal is transmitted to the layered video decoder (not shown) that includes the base layer decoder module 270 and the enhancement layer decoder module 280.

The base layer decoder module 270 receives and correctly decodes the base layer 310 while remaining unaware of the enhancement layer 330. The base layer decoder module 270 can be, if desired, an unmodified standard video decoder (such as a MPEG-2 decoder) that receives and decodes the base layer 310. The enhancement layer decoder module 280 receives a subscribed enhancement layer 350, ignores any part of the enhancement layer 330 that is not subscribed (i.e. an unsubscribed enhancement layer 360), and decodes the subscribed enhancement layer 350. The base layer 310 includes motion vectors for base layer motion compensation. In a preferred embodiment, the motion vectors from the base layer and the decoded I-frames 370 are used by both the base layer decoder module 270 and the enhancement layer decoder module 280 for decompression.

Alternatively, the base layer 310 may include, in addition to the encoded low-resolution information, any other type of "leveraged" information. This leveraged information is defined as information used by both the base layer decoder module 270 and the enhancement layer decoder module 280. In effect, the enhancement layer 330 "leverages"the information being transmitted in the base layer 310, thereby reducing the amount of (and avoiding any duplication on information that must be transmitted in the enhancement layer 330. This leveraging of information makes available a greater amount of bit rate to, for example, the enhancement layer 330 for sending more high-resolution information.

In other preferred embodiments, other types of base layer data could be used to improve enhancement layer performance by using the data for decoding both the base layer and enhancement layer. For example, the base layer data could include base-layer 16×16 macroblock prediction modes, which specify the type of prediction (e.g., intraframe or interframe prediction) applied for each macroblock. Further, the base layer data could include local statistics for base-layer quantized residual difference coding data such as, for example, the number of non-zero transmitted discrete cosine transform (DCT) coefficients in a 16×16 macroblock or 8×8 block. Macroblock prediction modes and DCT coefficients are video coding elements which are well known to those skilled in the art, and thus will not be explained further.

III. Layered Video Encoder

Base Layer Module

Figure 4:
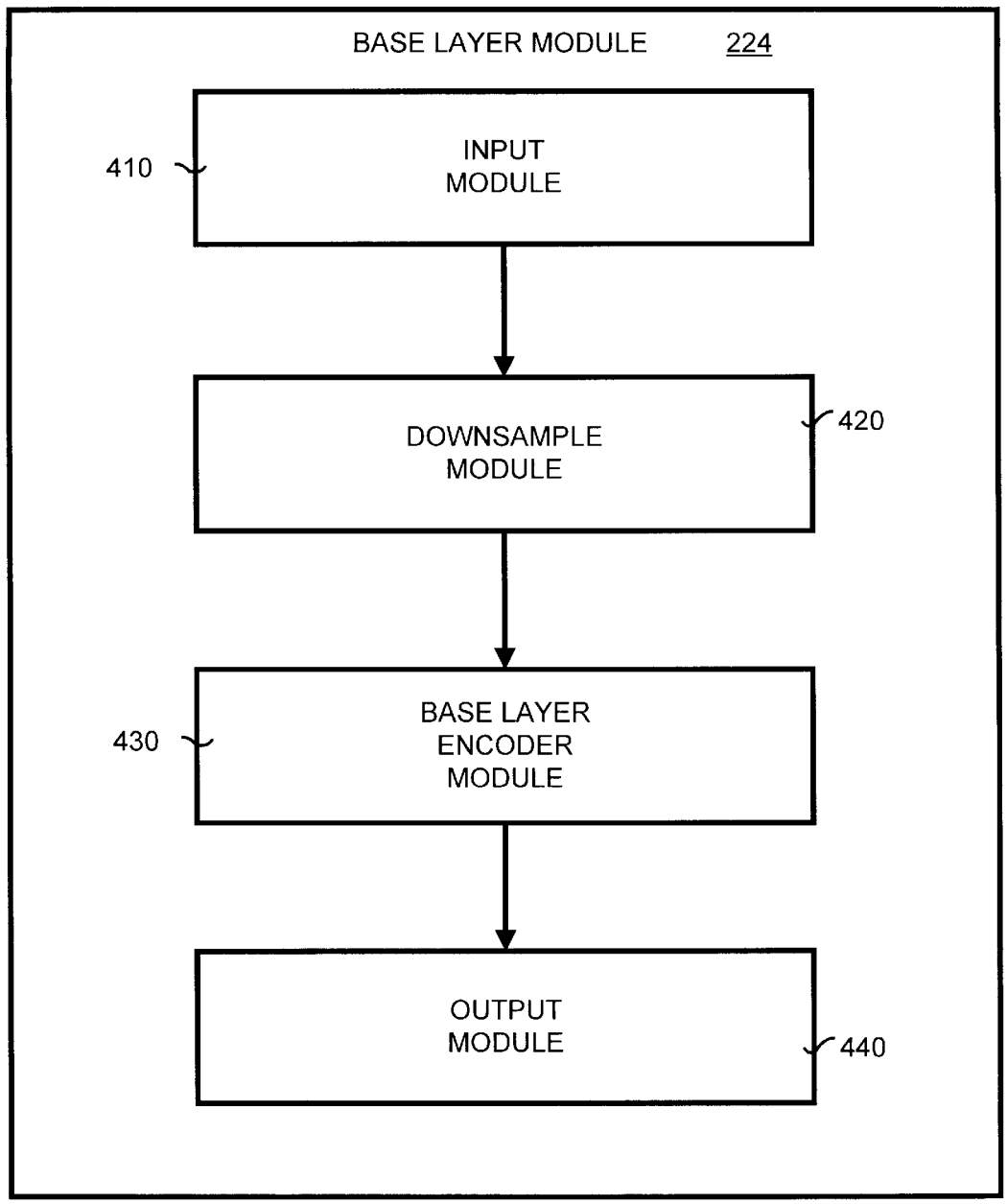
FIG. 4 is a block diagram illustrating the base layer module of the layered video encoder.

FIG. 4 is a block diagram illustrating the base layer module 224 of the layered video encoder 220. In general, the base layer module 224 receives and downsamples a high-resolution video sequence, encodes the resultant low-resolution video using a low-resolution encoder, and outputs a low-resolution encoded base layer that can be decoded by a conventional video decoder. For example, the encoded base layer can be a MPEG-2 layer that is capable of being decoded by a MPEG-2 decoder. The high-resolution video sequence is typically a video stream that contains a sequence of video frames, wherein each frame is equivalent to a still image. As explained in detail below, the low-resolution encoder of the present invention differs from a conventional compressor because the present invention does not compute motion vectors internally but instead uses pre-calculated "downsampled" motion vectors computed from the high-resolution video sequence.

An input module 410 receives the high-resolution video sequence and computes a set of high-resolution motion vectors corresponding to the video sequence. The video sequence and motion vectors are passed to a downsample module 420 that "downsamples" the high-resolution video sequence. The downsample module 420 also "downsamples" the high-resolution motion vectors to create a low-resolution video sequence with corresponding low-resolution motion vectors. The downsampled video sequence and motion vectors are then used by a low-resolution base layer encoder module 430 to encode the video sequence in a conventional compression format (such as the standard MPEG-2 format). Rather than compute motion vectors internally from the low-resolution video sequence, the base layer encoder module 430 accepts and uses previously calculated "downsampled" motion vectors to encode the low-resolution video sequence. The output of the base layer encoder module 430, which is a base layer encoded in a conventional compression format that can be, if desired, compatible with standard format decoders, is sent to the output module 440 for output from the base layer module 224.

Figure 5:
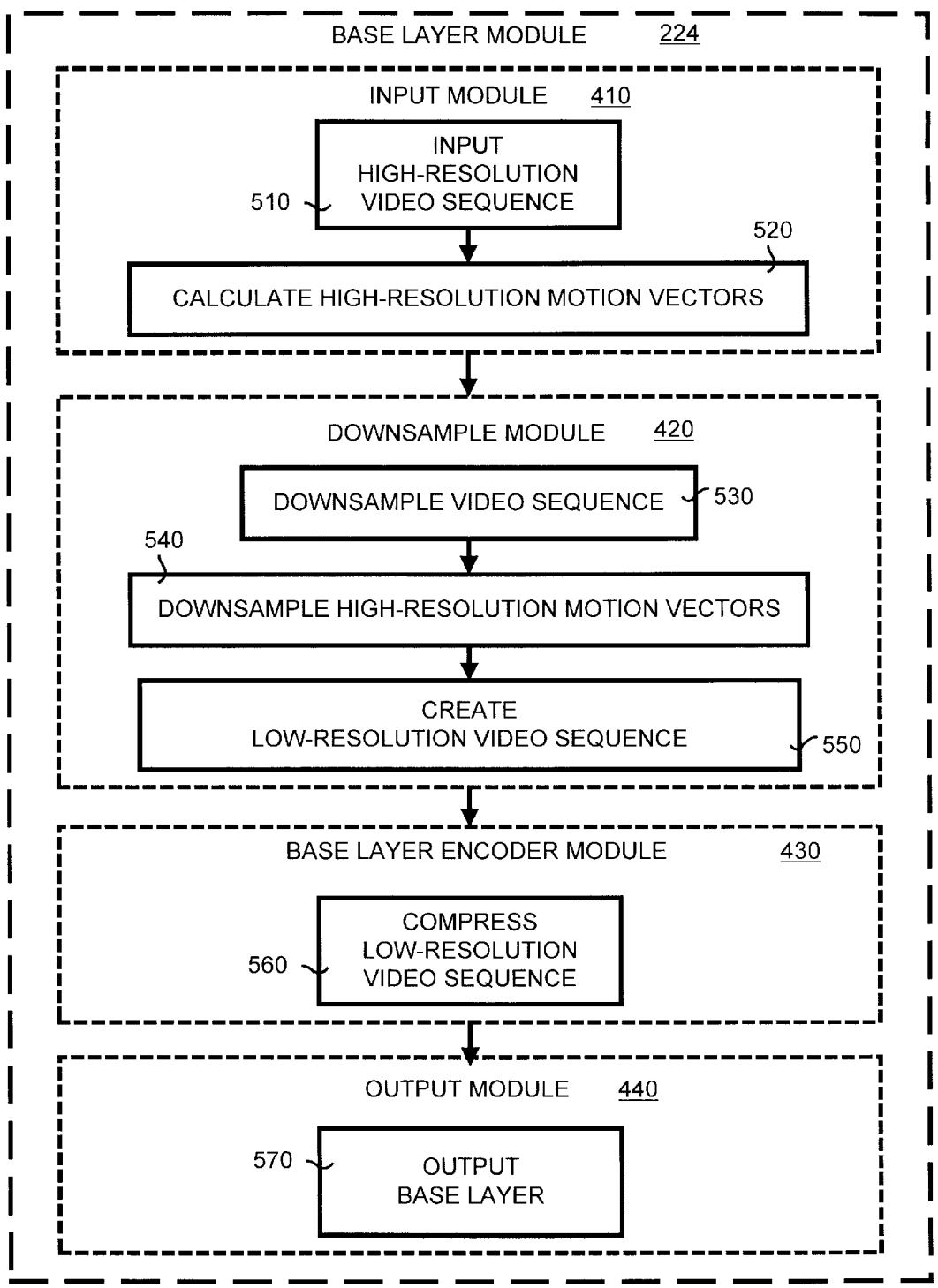
FIG. 5 is a detailed flow diagram of the operation of the base layer module shown in FIG. 4.

FIG. 5 is a detailed flow diagram of the operation of the base layer module 224 shown in FIG. 4. The input module 410 receives the high-resolution video sequence (box 510) and calculates the corresponding high-resolution motion vectors (box 520). The downsample module 420 downsamples the high-resolution video sequence (box 530) in order to create a low-resolution video sequence (box 550). In addition, the high-resolution motion vectors are downsampled (box 540) and sent to the modified base layer encoder module 430. In general, downsampling is taking information from a high-resolution scale and scaling down the information to a low-resolution scale. The downsampling process applied to produce the low-resolution video from the high-resolution video can be performed using any of a number of methods familiar to those skilled in the art. These methods include, for example, the application of methods known in the art as linear multi-rate polyphase filter banks. The downsampling process applied to produce the low-resolution motion vectors from high-resolution motion estimation involves scaling down the motion vectors to adjust for the reduction in picture resolution and rounding the scaled vectors to an accuracy appropriate for transmission with the lower resolution base layer data. The downsampling process may also include choosing from among a number of candidate downscaled motion vectors in order to optimize the performance and adjusting the motion compensation block size to be appropriate for use at the lower resolution.

As an illustration, if the high-resolution motion vectors are produced by a conventional block motion estimation using a block size of 16×16 at a high 1280×720 resolution, these motion vectors may be scaled down, refined to ½-sample resolution, and selected for application to a 16×16 block size at the lower resolution. This may include scaling the motion vectors down vertically by a factor of 9/16 and horizontally by a factor of ⅔ and refining them to the nearest multiple of ½ using a mean-squared prediction error criterion. Further, motion vectors may be chosen from up to four such motion vectors affecting each 16×16 area of the low resolution image using a mean-squared prediction error criterion in order to choose one lower-resolution half-sample accuracy motion vector for each 16×16 block in a 640×480 base layer that matches the requirements of the low-resolution base layer encoder module 430.

The low-resolution base layer-encoder module 430 receives and compresses the low-resolution video sequence (box 560). This encoding may be performed using a standard compression format to ensure backward compatibility with existing standard video decoders. In a preferred embodiment the base compression format is one of the MPEG formats such as, for example, a MPEG-2 compression format. This encoded information is contained within a base layer and is sent to the output module 440 for output from the base layer module 224. The output base layer may be in a standard compression format that can be decoded by standard video decoders.

Figure 6:
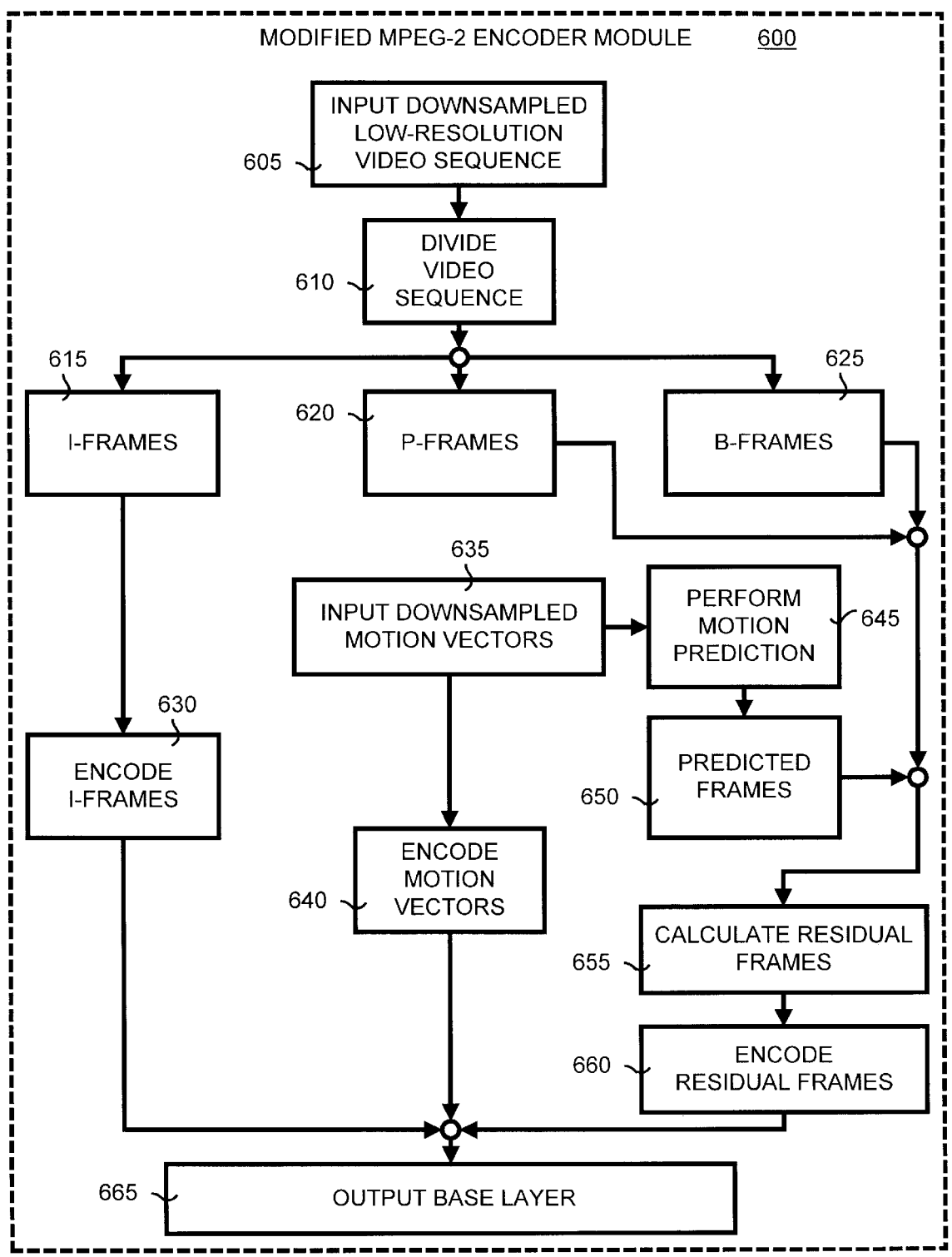
FIG. 6 illustrates an example of the low-resolution encoder module shown in FIGS. 4 and 5.

FIG. 6 along with FIG. 5 will be used to illustrate an exemplary operation of the base layer module 224 and a preferred embodiment of the base layer encoder module 430. In this example, the compression format used in the base layer module 224 is the MPEG-2 format. Referring to FIG. 5, a high-resolution video sequence is received by the input module 410 and associated high-resolution motion vectors are calculated. This information is sent to the downsample module 420 where the resolution of the high-resolution video sequence is downsampled to create a low-resolution video sequence and high-resolution motion vectors are also downsampled. Both the low-resolution video sequence and the downsampled motion vectors are sent to the base layer encoder module 430 that, in this example, is a modified MPEG-2 encoder module 600 that is discussed in detail below. The modified MPEG-2 encoder module 600 has been modified to accept downsampled motion vectors that were previously calculated from the high-resolution video sequence. The compressed low-resolution video sequence is then sent to the output module 440. The output of the output module 440 is a low-resolution MPEG-2 layer that, if preferred, can be designed to be fully compatible with the MPEG-2 standard.

FIG. 6 further illustrates the operation of the modified MPEG-2 encoder module 600 of this exemplary example. In general, the modified MPEG-2 encoder module 600 compresses the low-resolution video sequence by storing only the changes from one frame to another frame and using motion compensation to approximate the changes in image content. The changes remaining after motion compensation are then encoded using a discrete cosine transform (DCT) technique, Which is well-known in the art.

The downsampled low-resolution video sequence is received by the modified MPEG-2 encoder module 600 (box 605) and divided into three frame sets (box 610). These three frame sets include the intra (I)-frames (box 615), the predicted (P)-frames (box 620) and the bi-direction ally-predicted (B)-frames (box 625). The I-frames are independently encoded using lossy DCT compression (box 630) and then become part of the MPEG-2 base layer.

Downsampled motion vectors that were calculated from the high-resolution video sequence (box 520) are received by the modified MPEG-2 encoder module (box 635) and used in motion prediction. Typically, in a traditional MPEG-2 encoder, the motion vectors are calculated internally by using the I-frames and the P-frames to find motion estimates on a block-by-block basis (such as 16×16 pixel blocks). Motion estimation for the prediction of P-frames in such a traditional MPEG-2 encoder is typically performed by finding the best matching block in the previous I-frame or P-frame for each block in the current frame. A motion vector, which is a displacement of the best matching block from the location of the block in the current frame, is then calculated. The process of motion estimation for the encoding of B-frames is similar, but uses both the previous and subsequent I-frames and P-frames as references. In the present invention, however, the modified MPEG-2 encoder module does not calculate the motion vectors internally and instead receives the downsampled motion vectors that have been previously calculated from the high-resolution video sequence. The motion vectors are then losslessly encoded using a compression format (such as Huffman coding) and are added to the output base layer (box 640, which in this case is an MPEG-2 layer.

In addition, the downsampled motion vectors are used to perform motion prediction (box 645). Generally, motion prediction includes using the motion vectors (and doing any necessary interpolation) to find the best matching block from the previous I-frame or P-frame (and, if a bidirectional motion frame, the next frame) and copying this best matching block to create a new frame. In this way, new predicted I-frames, P-frames and B-frames are generated (box 650).

Next, residual frames, which include residual P-frames and B-frames, are calculated by taking the difference between the original frames and the predicted frames (box 655). For example, the difference between the original P-frames and the predicted P-frames are computed to generate a residual P-frame. The residual frames are then DCT encoded (box 660) and added to the output MPEG-2 base layer. The combination of the DCT-coded I-frames, the encoded motion vectors and the DCT-coded residual frames comprise the major part of the output MPEG-2 base layer (box 665).

Enhancement Layer Module

Figure 7:
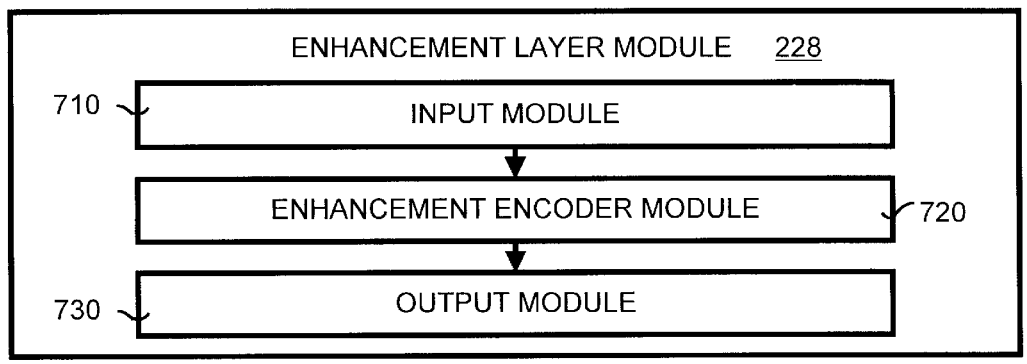
FIG. 7 is a block diagram illustrating the enhancement layer module of the layered video encoder.

FIG. 7 is a block diagram illustrating the enhancement layer module 228 of the layered video compressor 220. In general, the enhancement layer module 228 inputs the base layer and the high-resolution video sequence and, in a preferred embodiment, also the high-resolution motion vectors. The enhancement layer module 228 outputs an encoded enhancement layer. An input module 710 receives the base layer and the high-resolution video sequence and, in a preferred embodiment, the high-resolution motion vectors. This information is sent to an enhancement encoder module 720 for extraction of information from the base layer and compression of the high-resolution video sequence. The compressed video sequence is sent to an output module 730 that outputs an enhancement layer containing high-resolution information.

Figure 8:
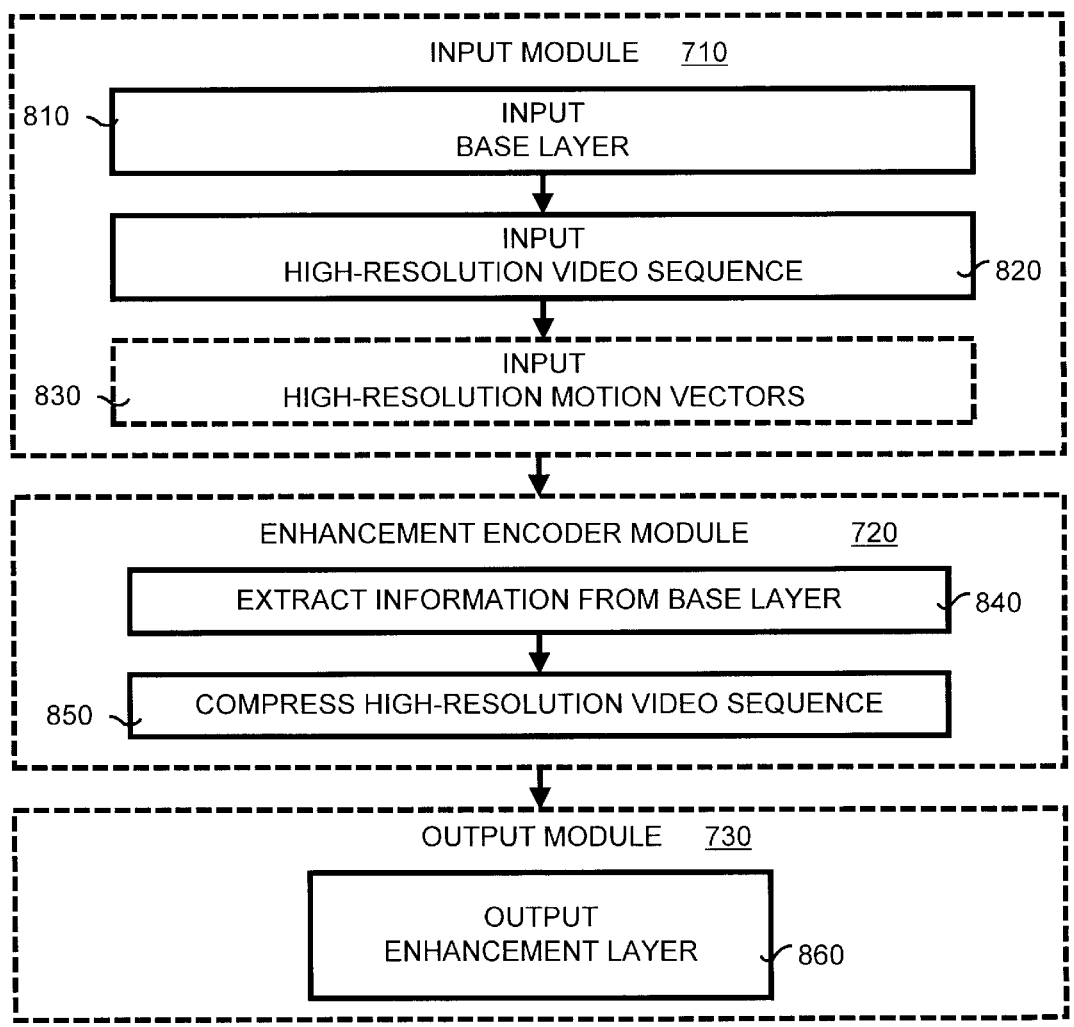
FIG. 8 is a detailed flow diagram of the operation of the enhancement layer module shown in FIG. 7.

FIG. 8 is a detailed flow diagram of the operation of the enhancement layer module shown in FIG. 7. The input module 710 receives as input the base layer (box 810), the high-resolution video sequence (box 820) and, in a preferred embodiment, the high-resolution motion vectors that were computed from the high-resolution video sequence (box 830). This optional step is illustrated by the dashed box 830. This input information is sent to the enhancement encoder module 720 where any necessary information contained in the base layer is extracted (box 840). In addition, as detailed below, the high-resolution video sequence is compressed into an encoded enhancement layer. The output module 730 outputs the high-resolution enhancement layer (box 860) from the enhancement layer module 228.

The degree of enhancement provided by the enhancement layer can be continuously varied to meet specific performance criteria. For example, the degree of enhancement provided may be selected to fit within a particular fixed bit rate channel capacity or may be selected to fulfill some fidelity criterion while allowing the bit rate to vary as necessary. Further, different distinct enhancement layers can be added to the same base layer, which allows the encoder to produce a number of different degrees of enhanced video quality for delivery to decoders having differing channel capacities.

Figure 9:
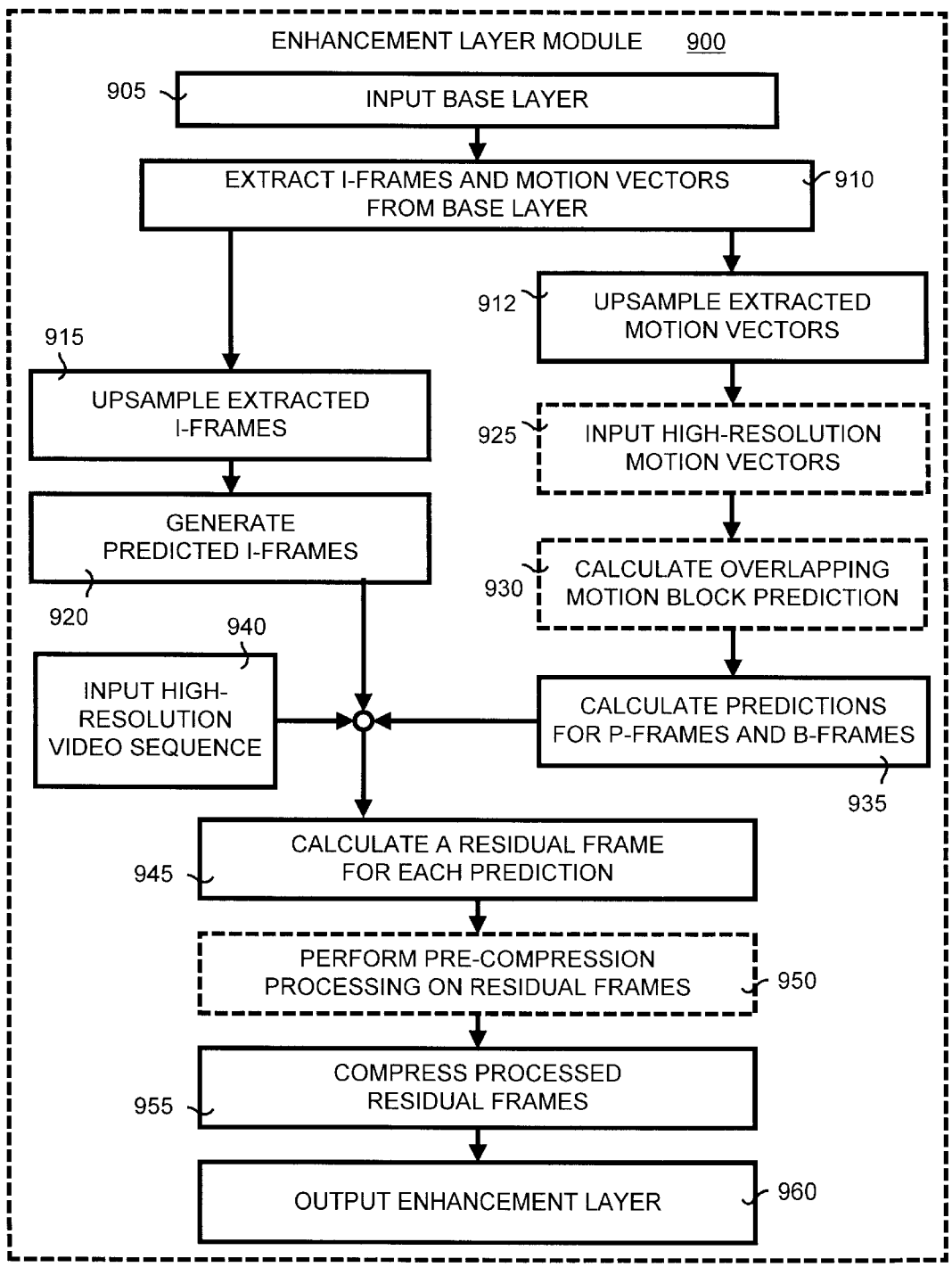
FIG. 9 illustrates an example of the enhancement layer module shown in FIG. 7.

FIG. 9 is a flow diagram that illustrates the operation of an exemplary example and a preferred embodiment of the enhancement layer module 228 shown in FIG. 7. In this example, the compression format used in the enhancement layer module 900 is also based on conventional DCT coding techniques, which are well known in the art. In alternate embodiments compression of the enhancement layer can be based on other image or video compression techniques, such as a wavelet-based compressor. In a preferred embodiment, the compression of the enhancement layer is based on a progressive wavelet codec (PWC)). PWC technology is discussed by H. S. Malvar in "Fast Progressive Wavelet Coding," pages 336–343 of the IEEE Data Compression Conference (Snowbird, Utah, March 1999), the entire contents of which are hereby incorporated by reference.

Referring to FIG. 9, a base layer is received by the enhancement layer module 900 (box 905) and the I-frames and motion vectors are extracted (i.e. decoded) from the base layer (box 910). The I-frames are then upsampled (box 915) to generate predicted I-frames (box 920). These predicted I-frames are used later in the determination of certain residual frames.

The motion vectors from the base layer are upsampled for use at the higher resolution (box 912). These upsampled motion vectors are used to form the predictions for the P-frames and B-frames (box 935). A preferred embodiment includes the optional step of using the upsampled motion vectors as predictions for the encoding of high-resolution motion vectors as calculated in the base layer module 224 and received by the enhancement layer module 900 (shown as dashed box 925). Also, in a preferred embodiment, the optional step of overlapping motion block prediction (shown as dashed box 930) is used in the calculation of P-frame and B-frame predictions. As discussed further below, overlapping motion block prediction (such as, for example, overlapped block motion compensation) smoothes the edges of adjacent macroblocks (such as 16×16 pixel macroblocks) as they are reassembled during decoding.

The high-resolution input video sequence is received by the enhancement layer module 900 and, for each original input frame, a prediction is formed and a residual frame difference is computed (box 945). These residual frames are calculated by taking the difference between the predicted frames and the actual frames taken from the high-resolution video sequence.

In a preferred embodiment, optional pre-compression processing is then performed on the residual frames using a series of nonlinear operations (shown as dashed box 950). Pre-compression is an optional step that modifies residual values in the residual frames so that some parts of the residual frames are amplified and others are attenuated. The modification is based on an assessment of the visual importance of each residual value. In this way, the encoder uses its resources (such as bits) on residual information that is most relevant to the human eye. In other words, pre-compression processing eliminates or reduces the influence of information that is unimportant or visually imperceptible to a viewer but nonetheless is costly to encode. Pre-compression processing is a series of lossy and lossless operations that modifies values from the residual frames. These modifications are generally attenuation of residual values that are less noticeable by the human eye, and can also include amplification of residual values to which the eye is most sensitive.

The processed residual frame is then compressed using a wavelet or other type of compression format (box 955), such as the same DCT-based method used for coding residual differences in standard video coders such as MPEG-2. In a preferred embodiment, the compression method is the progressive wavelet codec (PWC) discussed above. One reason the PWC method is preferred is because of its ability to order the coded information so that, given the first part of total compressed data, a decoder can retrieve the best possible approximation to the coded image. In alternate embodiments, other compression methods may be used to compress the residual frames. The compressed residual frames are then incorporated into an enhancement layer (box 960), which is the output for the enhancement layer module 900.

In an alternate embodiment, the high-resolution motion vectors are not used in the enhancement layer module (in other words, box 925 is absent). In this alternate embodiment, it should be noted that the output enhancement layer data does not include the motion vectors because only the low-resolution motion vectors in the base layer are used for the motion compensation. This results in a savings of the bit rate for motion vector data as a result of sending motion vector data only in the base layer.

In a preferred embodiment in which the high-resolution motion vectors are used (in other words, box 925 is present), the output enhancement layer motion vector data includes only the encoded differences between the high-resolution motion vectors and then motion vectors obtained from a prediction of those motion vectors formed using the upsampled low-resolution motion vectors from the base layer. In this preferred embodiment, the bit rate required for sending high-resolution motion vector data is reduced due to the prediction of the high-resolution motion vectors using the upsampled low-resolution motion vectors from the base layer.

The extra bit rate savings afforded by reducing the bit rate needed for sending motion vectors in the enhancement layer permits the present invention to add information to the enhancement layer so that higher fidelity to the original high-resolution video sequence can be achieved during decoding. One example of added information is having the enhancement layer module 900 generate a prediction for the I-frames and then including a residual I-frame in the enhancement layer that captures the deviation of the predicted I-frame from the actual I-frame. Bit rate saved by reducing the bit rate used for motion vectors permits additional information to be included in the enhancement layer (which can be used to improve the residual I-frames) thereby increasing the fidelity of the decoded video signal.

As mentioned above, one optional step in the enhancement layer module 900 is the overlapping motion block prediction calculation (box 930). This technique is well-known to those art and therefore the details will not be discussed in depth. The reason, however, that overlapping motion block prediction is useful is because in a conventional motion compensated video coding format the motion vectors are applied to a macroblock (for example, a 16×16 pixel macroblock) and each macroblock has a "hard edge". This means that all of the values within the macroblock are copied directly from the preceding (and next, if bi-directional) images. This creates areas at the boundary of adjacent macroblocks where pixels on one side of the boundary do not visually match up with pixels on the other side of the boundary.

When applying motion vectors to the high-resolution I-frames and P-frames the boundary problem can be reduced by using overlapping motion blocks. The importance of using this technique is twofold. First, the compressibility of the macroblocks is increased by reducing the amount of prediction error near the edges of blocks. Second, because the residual frames received by the decoder will be quantized, the boundary problem will not be completely eliminated and will be perceptually distracting to a viewer. Using overlapping motion block prediction both increases compressibility and reduces the distracting boundary problem between macroblocks. In effect, using overlapping motion block prediction "smoothes" the boundary of adjacent macroblocks.

IV. Layered Video Decoder

Base Layer Decoder Module

The layered video decoder module 260 of the present invention includes a base layer decoder module 270 for decompressing the base layer of the video signal. Referring to FIGS. 2 and 3, the base layer decoder module 270 receives the transmitted base layer from the base layer module 224. The base layer prepared by the base layer module 224 is, in a preferred embodiment, completely compatible with existing standard video compression technology and therefore requires no modification of a standard video decoder. Thus, in a preferred embodiment, the base layer decoder module 270 includes a standard format decoder for decoding the encoded base layer using a standard compression format (such as MPEG-2).

For example, in a preferred embodiment the base layer is an MPEG-2 layer and the base layer decoder module 270 is a MPEG-2 decoder. Although the base layer is specially prepared using motion vectors previously calculated from a high-resolution video sequence and then downsampled, the base layer is completely compatible with MPEG-2 technology. As a result, without any modifications MPEG-2 decoders can receive and correctly decode the base layer prepared by the present invention while remaining completely unaware of the enhancement layer. In addition, the video fidelity of the decoded base layer is approximately the same as that achieved with traditional technology in current use. This is because motion vectors obtained from a high resolution video and then downsampled to apply to lower-resolution video are generally equally as effective at prediction of lower-resolution video content as those obtained from use of lower-resolution video.

Enhancement Layer Decoder Module

Figure 10:
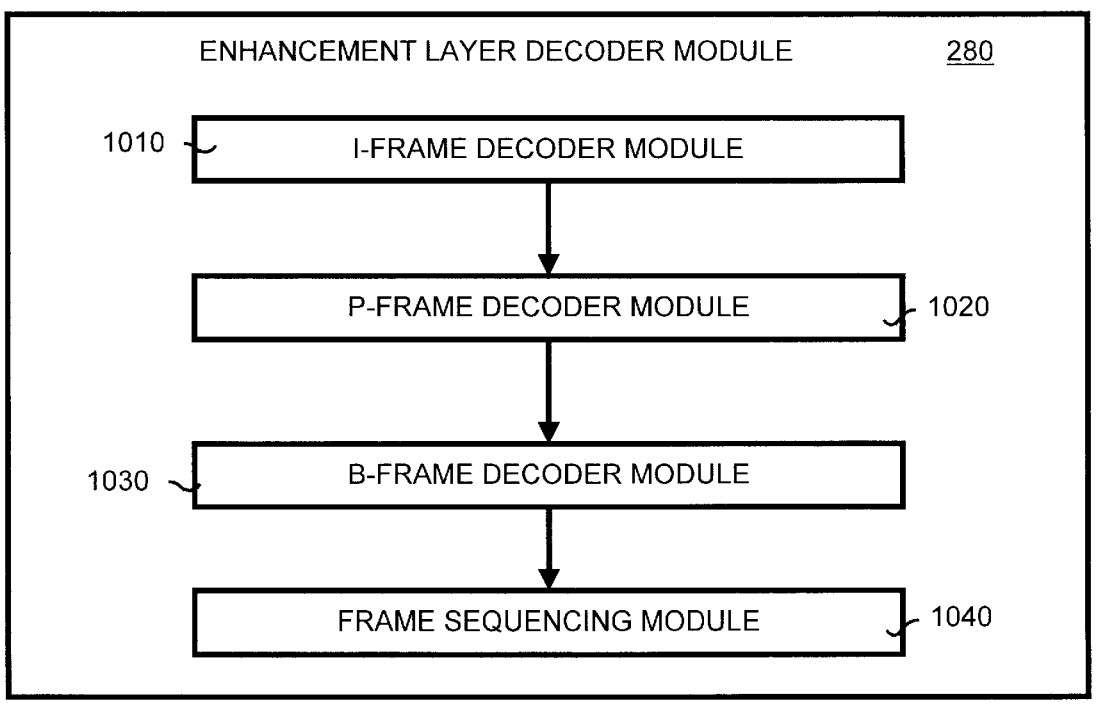
FIG. 10 is a block diagram illustrating the enhancement layer decoder module of the layer video decoder.

FIG. 10 is a block diagram illustrating the enhancement layer decoder module 280 of the layered video decoder 260. The enhancement layer decoder module 280 of the present invention receives the encoded enhancement layer and the base layer data, decodes information contained within the enhancement layer and outputs this information for viewing on, for example, a HDTV set. Further, the amount of enhancement provided by the enhancement layer decoder module 280 may be varied to some degree (without any modification to the enhancement layer data) by decoding only the amount of information within the enhancement layer needed to provide the enhancement desired. This is accomplished in part by decoding more bits of information contained in the enhancement layer in order to increase the fidelity of the decoded layer. Typically, the amount of enhancement subscription is user selected but, alternatively, may be selected by others (such as a cable service provider or a television manufacturer) or may depend on the computational resources available in the decoder.

The enhancement layer decoder module 280 receives the amount of the encoded enhancement layer needed to provide the subscribed enhancement. In addition, as described in detail below, the enhancement layer decoder module 280 also receives input from the base layer. An I-frame decoder module 1010 decompresses the residual I-frame data within the enhancement layer, adds this decoded residual information to I-frame predictions, and creates high-resolution decoded I-frames. A P-frame decoder module 1020 decompresses the residual P-frame data contained in the enhancement layer, adds this decoded residual information to P-frame predictions formed using motion compensation and generates high-resolution decoded P-frames. Similarly, a B-frame decoder module 1030 decompresses the residual B-frame data, adds this decoded residual information to B-frame predictions and produces high-resolution decoded B-frames. A frame sequencing module 1040 receives the high-resolution I-frames, P-frames and B-frames, merges the frames into a stream of decoded pictures and outputs the final high-resolution decoded frames.

Figure 11A:
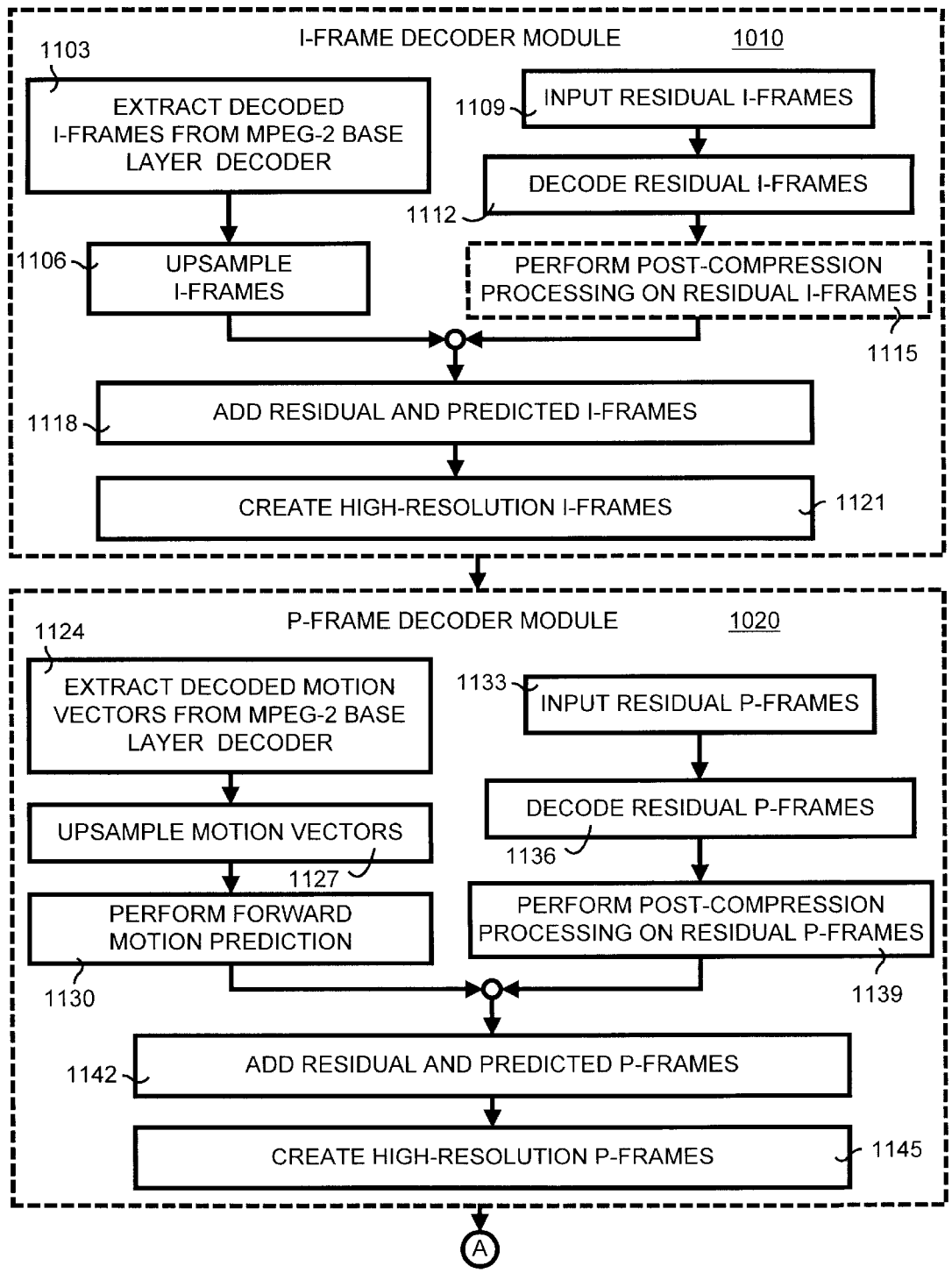
FIG. 11A is a detailed flow diagram of the operation of the I-frame decoder module and the P-frame decoder module shown in FIG. 10.
Figure 11B:
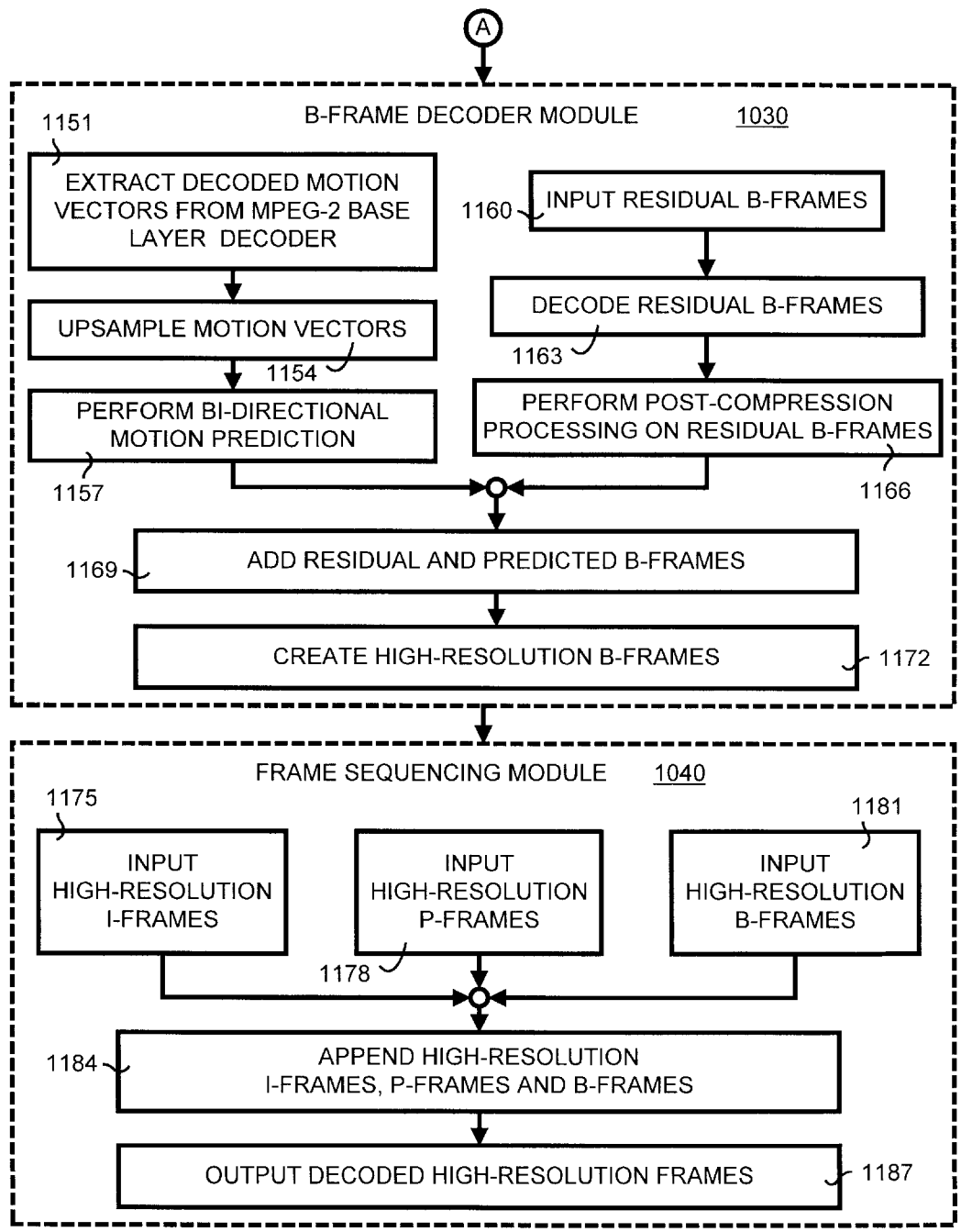
FIG. 11B is a detailed flow diagram of the operation of the B-frame decoder module and the frame addition module shown in FIG. 10.

FIGS. 11A and 11B are an exemplary example of a preferred embodiment of the present invention illustrating the operation of the enhancement layer decoder module shown in FIG. 10. In this preferred embodiment, the base layer is an MPEG-2 layer and the low-resolution motion vectors are contained and transmitted within the MPEG-2 base layer. Referring to FIG. 11A, the I-frame decoder module 1010 extracts decompressed I-frames from a MPEG-2 base layer decoder included in the base layer decoder module 270 (box 1103). The decompressed I-frames are then upsampled (box 1106) to provide a prediction of the high-resolution I-frames.

Residual I-frames contained in the enhancement layer are received by the I-frame decoder module 1010 (box 1109). These residuals are decompressed (box 1112) using an inverse of a compression format (such as the DCT or PWC coding methods discussed above) used by the enhancement layer module 228. Typically, this decompression is a pseudo-inverse compression because the encoding is lossy. In an optional step (as shown by the dashed box 1115) and in a preferred embodiment, post-compression processing, which similarly operates as the pseudo-inverse of the pre-compression processing that was used in the enhancement layer module 228, is performed on the residual I-frames. The predicted I-frames and the residual I-frames then are added (box 1118) to create high-resolution I-frames (box 1121).

The P-frame decoder module 1020 receives decoded motion vectors from the MPEG-2 base layer decoder (box 1124). These decompressed motion vectors are then upsampled (box 1127) and used to generate predicted P-frames using forward motion prediction (box 1130). In a preferred embodiment, enhancement of the upsampled motion vectors using additional enhancement layer motion refinement data (not shown) is also applied. Also in a preferred embodiment, overlapped block motion compensation is applied in the motion prediction stage. Residual P-frame data is also received by the P-frame decoder 1020 (box 1133) from the enhancement layer and decompressed (box 1136). Post-compression processing, which as discussed above is the pseudo-inverse of pre-compression processing, is performed on the residual P-frames (box 1139). The predicted P-frames and the residual P-frames then are added (box 1142) to create high-resolution P-frames (box 1145).

It should be noted that, for the enhancement layer decoder module 280, the meaning of residual frames is slightly different for I-frames and for P- and B-frames. Residual I-frames correct the prediction of I-frames formed by upsampling the I-frames from the base layer, whereas residual P-frames and B-frames correct the prediction of P-frames and B-frames based on motion information from the base layer and, in a preferred embodiment, additional motion refinement information from the enhancement layer.

Referring to FIG. 11B, the B-frame decoder module .1030 extracts decompressed motion vectors from the MPEG-2 base layer decoder (box 1151). These motion vectors are upsampled (box 1154) and bi-directional motion prediction is performed (box 1157) to create predicted B-frames. In a preferred embodiment, enhancement of the upsampled motion vectors using additional enhancement layer motion refinement data (not shown) is also applied. Also in a preferred embodiment, overlapped block motion compensation is applied in the motion prediction stage. Residual B-frames are received from the enhancement layer (box 1160), decoded using the pseudo-inverse of the compression format (box 1163) and post-compression processing is performed (box 1166). The predicted and residual B-frames then are added (box 1169) to create high-resolution B-frames (box 1172).

The frame sequencing module 1040 receives the output from the I-frame decoder module 1010, the P-frame decoder module 1020 and the B-frame decoder module 1030. Namely, inputs to the frame addition module 1040 are the high-resolution I-frames (box 1175), the high-resolution P-frames (box 1178) and the high-resolution B-frames (box 1181). These frames are then appended (box 1184) to create a final output of decoded high-resolution frames (box 1187) that, depending on the amount of subscribed enhancement, are a high-fidelity representation of the original high-resolution video sequence. The final output of decoded high-resolution frames are sent (box 1187) to a viewing device (such as a high-definition television (HDTV) set).

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for encoding a high-resolution video sequence containing low-resolution and high-resolution information, comprising:
   encoding the low-resolution information to create a base layer;
   encoding the high-resolution information to create an enhancement layer capable of enhancing the low-resolution information of the base layer;
   encoding base layer data within the base layer; and
   making the encoded base layer data available to both a base layer decoder and an enhancement layer decoder.

2. The method of claim 1, wherein the base layer is capable of being decoded independently of the enhancement layer.

3. The method of claim 2, wherein the base layer is capable of being decoded using a standard decoding format.

4. The method of claim 1, wherein the base layer data includes at least one of: (a) motion vector data; (b) macroblock prediction mode data; (c) quantized residual difference data including quantized discrete transform coefficient data; (d) quantized residual difference data including quantized wavelet coefficient data.

5. The method of claim 1, wherein the encoding of the low-resolution information uses an existing standard encoding format.

6. The method of claim 5, wherein the existing standard encoding format is at least one of: (a) H.261; (b) H.263; (c) MPEG-1; (d) MPEG-2; (e) MPEG-4.

7. The method of claim 1, further comprising generating base layer data by performing high-resolution motion estimation.

8. The method of claim 7, wherein the high-resolution motion estimation is performed at approximately the same resolution as the enhancement layer.

9. The method of claim 7, wherein the high-resolution motion estimation includes a high-resolution block matching search.

10. The method of claim 9, wherein motion vector estimates obtained from the block matching search are scaled down to apply at the lower resolution and rounded to an accuracy supported by an encoding format of the base layer.

11. The method of claim 10, wherein at least one motion vector is selected from the rounded motion vector estimates based on a fidelity criterion to adjust a first block size used for the high-resolution motion estimation to a second block size used for low-resolution motion representation.

12. The method of claim 9, wherein motion vector estimates obtained from the block matching search are scaled down to apply at the lower resolution and further processed by a local block matching search to an accuracy supported by an encoding format of the base layer.

13. The method of claim 1, wherein encoding the high-resolution information includes performing motion compensation using motion vector values obtained by scaling up base layer motion vectors that are used to predict high-resolution motion vector values.

14. The method of claim 13, wherein no motion vector values are contained in the enhancement layer.

15. The method of claim 13, wherein any prediction differences are contained in the enhancement layer.

16. The method of claim 13, further comprising selecting at least one of the scaled-up base layer motion vectors to adjust a first block size used for motion compensation in the base layer to a second block size used for motion compensation in the enhancement layer.

17. The method of claim 15, further comprising:
   selecting at least one of the high-resolution motion vectors to adjust a first block size used for motion compensation in the base layer to a second block size used for motion compensation in the enhancement layer; and
   predicting the high-resolution motion vectors using at least one of: (a) the scaled-up base layer motion vectors; (b) previously-encoded motion vectors contained within the enhancement layer.

18. The method of claim 1, wherein the base layer is created using overlapped block motion compensation.

19. The method of claim 1, wherein the enhancement layer is created using overlapped block motion compensation.

20. The method of claim 1, wherein encoding of the high-resolution information uses at least one of: (a) discrete cosine transform; (b) scalar inverse quantization; (c) wavelet coding; (d) progressive wavelet coding.

21. A computer-readable medium having instructions stored thereon that causes a computer to perform the method of claim 1.

22. A method of compressing high-resolution video frames containing low-resolution frames and high-resolution frames, comprising:

generating a base layer containing the low-resolution frames that is capable of being decompressed into a low-resolution video representation;

generating an enhancement layer containing the high-resolution frames that is capable of being decompressed into a high-resolution video representation;

placing compressed base layer data into the base layer; and providing the compressed base layer data to a base layer decompressor and an enhancement layer decompressor.

23. The method of claim 22, wherein the base layer data includes at least one of: (a) motion vector data; (b) macroblock prediction mode data; (c) quantized residual difference data.

24. The method of claim 22, wherein the base layer data is also capable of being used in the decompression of the base layer.

25. A method of decoding an encoded high-resolution video sequence containing a base layer and an enhancement layer, comprising:

decoding the base layer to generate a decoded low-resolution representation of the high-resolution video sequence;

extracting encoded base layer data from the base layer; and decoding the enhancement layer using the encoded base layer data and the decoded low-resolution representation to provide enhancement to the decoded low-resolution representation.

26. The method of claim 25, wherein the base layer data includes motion vector data that was encoded within the base layer.

27. The method of claim 26, wherein the base layer data includes at least one of: (a) macroblock prediction mode data; (b) quantized residual difference data; (c) quantized discrete cosine transform coefficient data.

28. The method of claim 26, wherein the base layer data includes quantized residual difference data and quantized wavelet coefficient data.

29. The method of claim 28, wherein a residual encoding format for the enhancement layer uses at least one of: (a) discrete cosine transform; (b) scalar inverse quantization; (c) wavelet coding; (d) progressive wavelet coding.

30. The method of claim 25, wherein the base layer is decoded independently of the enhancement layer.

31. The method of claim 30, wherein a motion compensation process for the enhancement layer uses motion vectors obtained by scaling up base layer motion vectors and rounding them to an accuracy appropriate for use in the enhancement layer.

32. The method of claim 25, wherein the enhancement layer is decoded using base layer motion vectors to predict enhancement layer motion vectors.

33. The method of claim 32, wherein the enhancement layer motion vectors are obtained by scaling up the base layer motion vectors and rounding them to an accuracy suitable for use with the enhancement layer.

34. The method of claim 33, wherein the base layer data includes at least one of the following: (a) information used to select from a plurality of predicted enhancement layer motion vectors so as to adjust a first block size in a motion compensation process; (b) information used to determine whether to perform a prediction of the enhancement layer motion vectors using scaled-up base layer motion vectors; (c) information used to determine whether to perform a prediction of the enhancement layer motion vectors using prior-encoded motion vectors within the enhancement layer.

35. The method of claim 25, wherein the base layer was encoded using overlapped block motion compensation.

36. The method of claim 25, wherein the enhancement layer was encoded using overlapped block motion compensation.

37. The method of claim 25, wherein the base layer was previously encoded using a standard compression format.

38. The method of claim 37, wherein the standard compression format is at least one of: (a) H.261; (b) H.263; (c) MPEG-1; (d) MPEG-2; (e) MPEG-4.

39. A computer-readable medium having instructions stored thereon that causes a computer to perform the method of claim 25.

40. A layered video encoder for encoding a high-resolution video sequence, comprising:

a base layer module that encodes at least a portion of a low-resolution video sequence to create a base layer, the low-resolution video sequence obtained from the high-resolution video sequence;

an enhancement layer module that encodes at least a portion of the high-resolution video sequence to create an enhancement layer that enhances the base layer; and encoded base layer data that is used by an enhancement layer decoder to decode the enhancement layer.

41. The layered video encoder of claim 40, wherein the base layer is capable of being decoded independently of the enhancement layer.

42. The layered video encoder of claim 41, wherein the encoded base layer data can be used to decode both the base layer and the enhancement layer.

43. The layered video encoder of claim 40, wherein the base layer module further comprises a downsample module that generates downsampled low-resolution motion vectors from high-resolution motion vectors, the high-resolution motion vectors being calculated from the high-resolution video sequence.

44. A computer-readable medium having computer-executable modules, comprising:

a base layer module that creates a low-resolution video sequence from a high-resolution video sequence and generates a base layer from the low-resolution video sequence;

an enhancement layer module that encodes at least a portion of the high-resolution video sequence to generate an enhancement layer; and encoded base layer data that is contained in the base layer and is used by a decoder to decode the enhancement layer.

45. A layered video decoder that decodes an encoded high-resolution video sequence containing a base layer and an enhancement layer, comprising:

a base layer decoder module that decodes the base layer to produce a decoded low-resolution representation of the video sequence;

an enhancement layer decoder module that decodes the enhancement layer to produce a high-resolution enhancement to the decoded low-resolution representation; and motion vector data that is used along with the decoded low-resolution representation to decode the enhancement layer.

46. The layered video decoder of claim 45, wherein the high-resolution enhancement can be varied to produce a desired enhancement to the low-resolution representation.

47. The layered video decoder of claim 45, wherein the base layer data is encoded in the base layer.

48. The layered video decoder of claim 45, wherein the enhancement layer decoder module includes a P-frame decoder module capable of determining at least one of: (a) whether to predict enhancement layer motion vectors using base layer motion vectors; (b) whether to predict enhancement layer motion vectors using prior-encoded enhancement layer motion vectors.

49. The method of claim 45, wherein the base layer decoder module decodes the base layer independently of the enhancement layer.

50. The method of claim 45, wherein the enhancement layer decoder module uses base layer motion vectors to predict enhancement layer motion vectors.

51. The method of claim 45, wherein the base layer was encoded using overlapped block motion compensation.

52. The method of claim 45, wherein the enhancement layer was encoded using overlapped block motion compensation.

53. A method for encoding a high-resolution video sequence, comprising:

computing a set of high-resolution motion vectors corresponding to the high-resolution video sequence;

downsampling the set of high-resolution motion vectors to generate a set of downsampled motion vectors;

downsampling the high-resolution video sequence to create a low-resolution video sequence; and generating a base layer by encoding the low-resolution video sequence using the downsampled motion vectors.

54. A method for encoding a high-resolution video sequence having low-resolution information and high-resolution information, comprising:

performing high-resolution motion estimation on the high-resolution video sequence to generate motion estimation results;

creating a base layer containing the low-resolution information using the motion estimation results;

creating an enhancement layer containing the high-resolution information; and incorporating motion vector data within the base layer for use in the decoding of the enhancement layer.

* * * * *